(12) United States Patent
Gandhi

(10) Patent No.: US 10,137,631 B2
(45) Date of Patent: Nov. 27, 2018

(54) DEVICE, SYSTEM, AND METHOD FOR FUSED DEPOSITION MODELING

(71) Applicant: TOYOTA MOTOR ENGINEERING & MANUFACTURING NORTH AMERICA, INC., Erlanger, KY (US)

(72) Inventor: Umesh N. Gandhi, Farmington Hills, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 413 days.

(21) Appl. No.: 14/922,225

(22) Filed: Oct. 26, 2015

(65) Prior Publication Data

US 2017/0113405 A1 Apr. 27, 2017

(51) Int. Cl.
| | |
|---|---|
| *B29C 67/00* | (2017.01) |
| *B29C 64/106* | (2017.01) |
| *B29C 64/386* | (2017.01) |
| *B33Y 10/00* | (2015.01) |
| *B33Y 30/00* | (2015.01) |

(52) U.S. Cl.
CPC .......... *B29C 64/106* (2017.08); *B29C 64/386* (2017.08); *B33Y 10/00* (2014.12); *B33Y 30/00* (2014.12)

(58) Field of Classification Search
CPC ..... B29C 64/106; B29C 64/386; B33Y 10/00; B33Y 30/00
See application file for complete search history.

(56) References Cited

U.S. PATENT DOCUMENTS

| | | |
|---|---|---|
| 2,408,627 A | 10/1946 | Green |
| 3,285,442 A | 11/1966 | Tigner |
| 5,468,429 A | 11/1995 | Li et al. |
| 5,514,308 A * | 5/1996 | Cohen ...................... B26F 1/26 156/308.8 |
| 6,036,467 A | 3/2000 | Jameson |
| 7,829,000 B2 | 11/2010 | Farr et al. |
| 8,182,255 B2 | 5/2012 | Plantá Torralba et al. |
| 2002/0019683 A1 | 2/2002 | White et al. |

* cited by examiner

*Primary Examiner* — Robert J Grun
(74) *Attorney, Agent, or Firm* — Oblon, McClelland, Maier & Neustadt, L.L.P.

(57) ABSTRACT

A system and method for fused deposition modelling that deposits using a nozzle a material on a substrate at a first predetermined temperature, moves, using processing circuitry, the nozzle and an ultrasonic hammer at a predetermined speed in a predetermined pattern to create an object, and hammers the deposited material using the ultrasonic hammer to compress the deposited material, wherein the deposited material is at a second predetermined temperature.

17 Claims, 5 Drawing Sheets

DEVICE, SYSTEM, AND METHOD FOR FUSED DEPOSITION MODELING

BACKGROUND

Ultrasonic energy can be applied to deposited materials. U.S. Pat. No. 7,829,000 entitled "Core-shell solid freeform fabrication" by Farr et al. describes applying ultrasonic to deposited materials via an ultrasonic transducer.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

The present disclosure relates to a fused deposition modelling system and associated methodology that deposits, using a nozzle, a material on a substrate at a first predetermined temperature, moves, using processing circuitry, the nozzle and an ultrasonic hammer at a predetermined speed in a predetermined pattern to create an object, and hammers the deposited material using the ultrasonic hammer to compress the deposited material, wherein the deposited material is at a second predetermined temperature.

The foregoing general description and exemplary implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
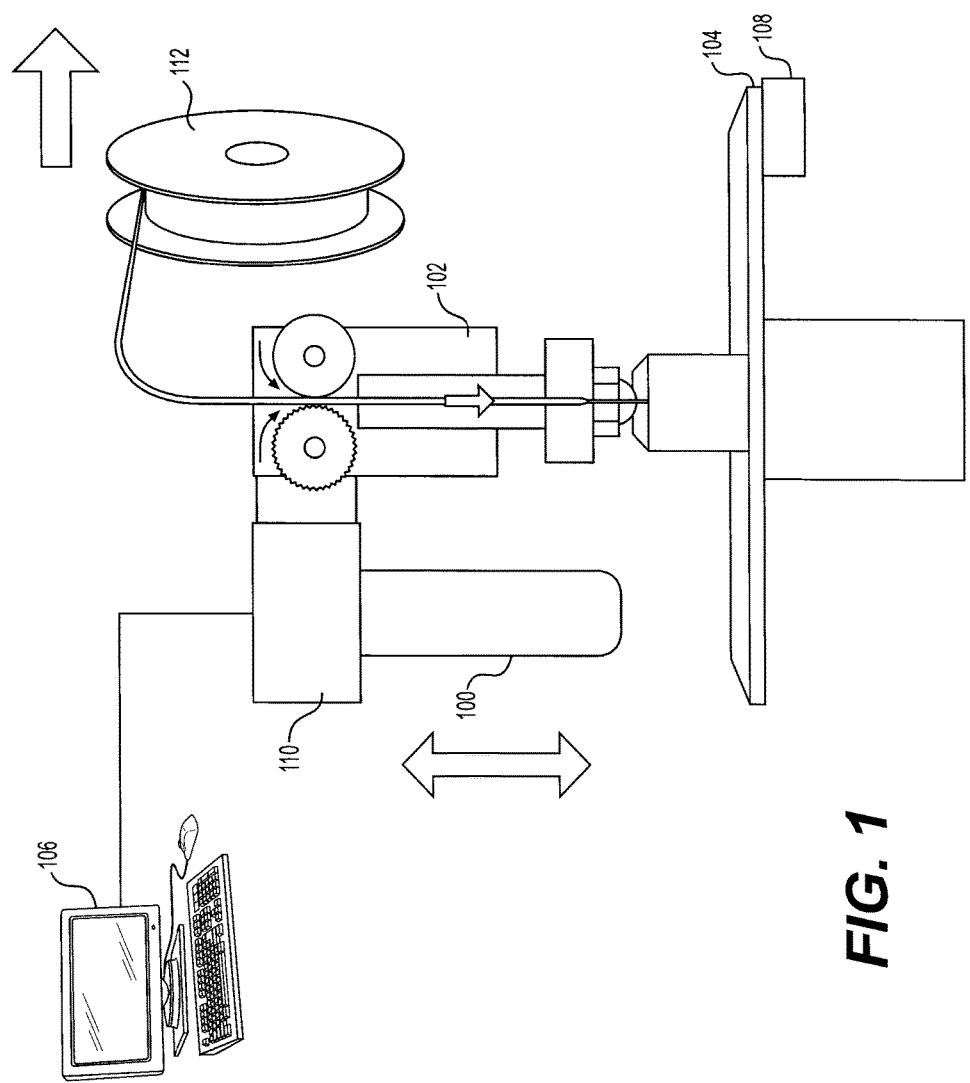
FIG. 1 is a schematic diagram of a fusion deposition system including an ultrasonic hammer according to one example.

Referring now to the drawings, wherein like reference numerals designate identical or corresponding parts throughout several views, the following description relates to a system and associated methodology for fused deposition modelling.

Further, as used herein, the words "a," "an" and the like generally carry a meaning of "one or more," unless stated otherwise. Furthermore, the terms "approximately," "about," and similar terms generally refer to ranges that include the identified value within a margin of 20%, 10%, or preferably 5%, and any values therebetween.

The fusion deposition system and associated methodology described herein improves the quality of deposited materials by eliminating cavities during a fused deposition modelling (FDM) process. The fusion deposition system described herein includes an ultrasonic actuated tip disposed proximal to a fusion disposition nozzle.

The FDM process involves a hot nozzle that melts a thermoplastic material and deposits the molten material on a substrate. During the process however, due to low pressure, the thermoplastic material does not compress. Typically, the material has a lower density in the vertical direction due to the formation of bubbles and/or cavities. The density in the vertical direction can be 70%-80% lower than the nominal density of the raw material.

FIG. 1 illustrates a fusion deposition system including an ultrasonic hammer 100 according to one example. The fusion deposition system includes a nozzle 102 (dispensing head) that melts thermoplastic materials and extrudes them onto the substrate deposited on a movable stage 104. The movable stage 104 and/or the nozzle 102 are controlled by a computing device 106 that provides X, Y, and Z coordinates for the movable stage 104 and/or the nozzle 102 to follow during printing. The movable stage 104 may be controllably moved by, for example, a shaft system, a belt system, a chain system, or the like.

The nozzle 102 may include a heating chamber (heater block) that melts the material to a predetermined temperature. The predetermined temperature may be a temperature higher than a melting temperature associated with the material as would be understood by one of ordinary skill in the art. In addition, the nozzle 102 includes a passage for feeding the material and at least one dispensing opening.

In one embodiment, the fusion deposition system may include a display panel 108 comprising a number of controls and displays. As the movable stage 104 operates, the display panel 108 may inform a user of operating conditions as well as provide the user with a user interface.

The computing device 106 may be communicatively coupled to a servo motor 110. The computing device 106 is configured to communicate commands to the servo motor 110 causing it to selectively position the nozzle 102 and the ultrasonic hammer 100.

The fusion deposition system may also include an extruder that uses torque and a pinch system to feed and retract the material precise amount. The fusion deposition system also includes a material source enabling the system to deposit continuously the material. In one example, the material source is a filament spool 112. The material may be in form of sheets, tapes, filaments, dots, or droplets. The material may be a thermoplastic material such as Acrylonitrile butadiene styrene (ABS), Nylon (PA6), Polyactic acid (PLA), Polycarbonate (PC), polyamide (PA), Polystyrene (PS), or the like.

The ultrasonic hammer 100 is disposed proximal to the fusion deposition nozzle 102. The ultrasonic hammer 100 may move in tandem with the nozzle 102 at a predetermined speed controlled by the computing device 106. The distance between the nozzle 102 and the ultrasonic hammer 100 is a function of the material being deposited. In one example, the distance may be controlled by the computing device 106 such that the deposited material has cooled to a second predetermined temperature. The second predetermined temperature is a function of the type of the material being deposited. The second predetermined temperature may be a temperature above the glass transition temperature and below the melting temperature of the material. The ultrasonic hammer 100 is an ultrasonic actuated tip. The ultrasonic hammer 100 hammers and compresses the deposited material on the substrate by applying a compressive load thereby strengthening the structure. The compression removes cavities and therefore improves the density of the material. Various substrates may be utilized such as wire mesh sandpapers.

Figure 2:
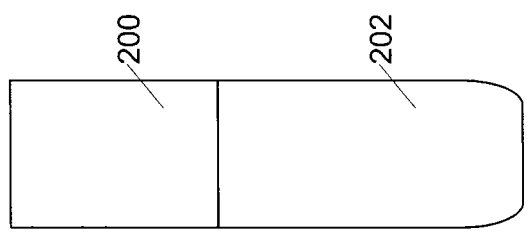
FIG. 2 is a schematic diagram of the ultrasonic hammer according to one example.
Figure 2:

FIG. 2 is a schematic of the ultrasonic hammer 100 according to one example. The ultrasonic hammer 100 may include a transducer 200 and an ultrasonic horn 202.

The ultrasonic vibrations are induced by the transducer 200 that consists of a plurality of possible mechanisms that include piezoelectric, magnetostrictive, ferroelectric or electrostrictive effect. A piezoelectric transducer may be made of a ceramic material that can operate under temperature and stress condition. In one embodiment, the ultrasonic hammer operates as a half-wave transformer with the piezoelectric transducer acting as a quarter wave resonator. Under this condition, the transducer 200 radiates most of its output energy forward into the ultrasonic horn 202.

The ultrasonic drive frequency and amplitude are a function of the type of the raw material used. Typically, the frequency ranges between (15 KHz to 60 KHZ). In one example, the amplitude may be equal to 20 microns. The frequency and amplitude are controlled by the computing device 106.

The ultrasonic horn 202 amplifies the ultrasonic vibrations that are induced by the transducer 200. The ultrasonic horn 202 may be powered by the servo motor 110 which actuates the ultrasonic horn 202 about its central axis preferably perpendicular to the movable stage 104. Various types of horn designs and ultrasonic power trains will be apparent to those of skill in the art, and this disclosure is not limited in this respect. In one embodiment, the ultrasonic horn assembly may be based on a reed-wedge design.

The computer device 106 controls the operating parameters such as horn pressure, vibration amplitude, and horn speed of the ultrasonic hammer 100.

In one embodiment, a first end of the ultrasonic horn 202 is connected to the transducer 200. A second end of the ultrasonic horn 202 may have a circular cross section with a diameter between 1 mm to 2 mm. The second end may have a corner radius of 0.2 mm. The ultrasonic horn 202 may be made of steel. In one embodiment, a removable tip may be attached to the second end of the ultrasonic horn 202. This permits the easy replacement of a head with another head of different diameter. The size and shape of the apparatus of the present disclosure can vary widely, depending, at least in part, on the number and arrangement of extrusion orifices and the operating frequency of the ultrasonic horn 202.

In one embodiment, the ultrasonic horn 202 may further include one or more sensors to detect the state of the deposited material such as temperature.

Figure 3:
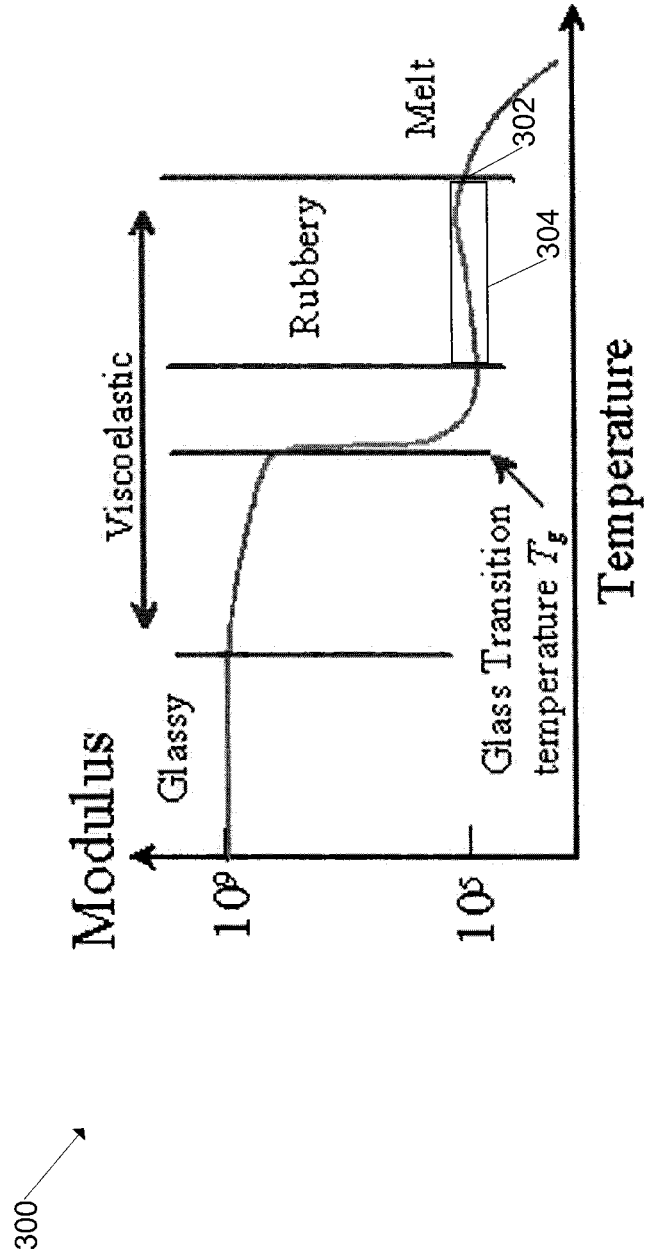
FIG. 3 is a schematic of a graph that shows the modulus of a material according to one example.

FIG. 3 is a schematic of a graph 300 that shows modulus of a material according to one example. The material is deposited at a temperature higher than the melting temperature indicated by 302 in the graph 300. The hammering of the material is done at a temperature in the range indicated by section 304 of the graph 300.

Figure 4:
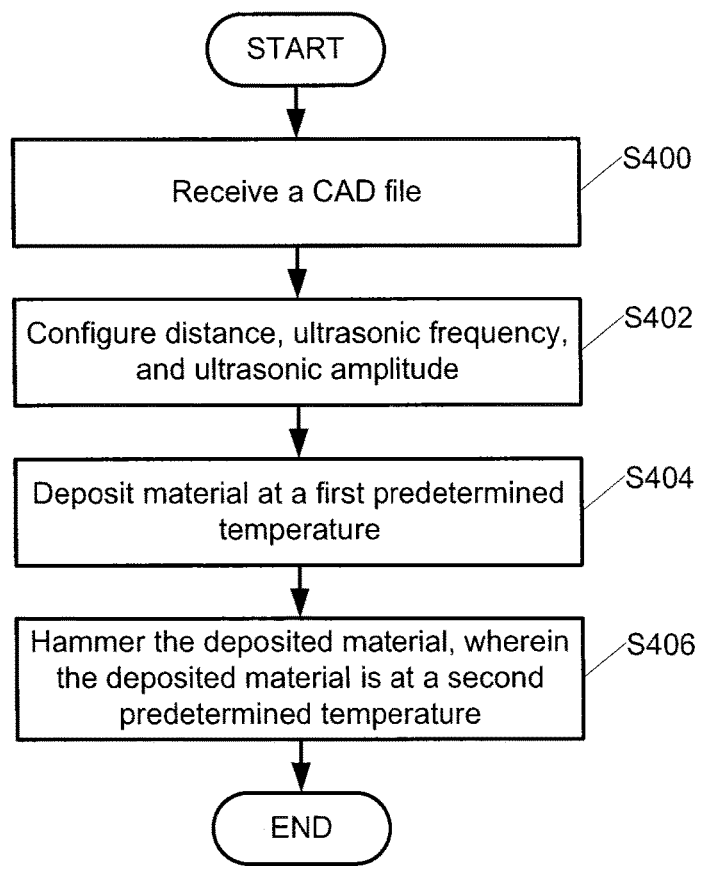
FIG. 4 is a flow chart for a method for fused deposition modelling according to one example.

FIG. 4 is a flow chart illustrating an exemplary method for fused deposition modelling according to one example. At step S400, the computing device 106 receives a file including computer-aided design (CAD) descriptions of an object to be produced. The file contains a number of servo and material dispenser commands configured to cause the system to selectively dispense the nozzle 102 and the ultrasonic hammer 100 in desired areas. At step S402, the computing device 106 configures the distance between the nozzle 102 and the ultrasonic hammer 100 as a function of the type of the material and a predetermined speed of the nozzle 102 and the ultrasonic hammer 100. The distance is determined such that when the ultrasonic hammer 100 is positioned above the deposited material, the deposited material has cooled to the second predetermined temperature. At step S404, the nozzle 102 deposits the melted material at a first predetermined temperature at a desired area. At step S406, the nozzle 102 and the ultrasonic hammer 100 are moved at the predetermined speed in a predetermined direction following a predefined pattern. At step S408, the deposited material is hammered by the ultrasonic hammer 100. Steps S404-S408 are repeated until the object is created. The properties of the material may be stored in a memory of the computing device 106.

In one embodiment, the method may further include cooling the deposited material to reach the second predetermined temperature using a medium, such as air, water, or Freon.

Figure 5:
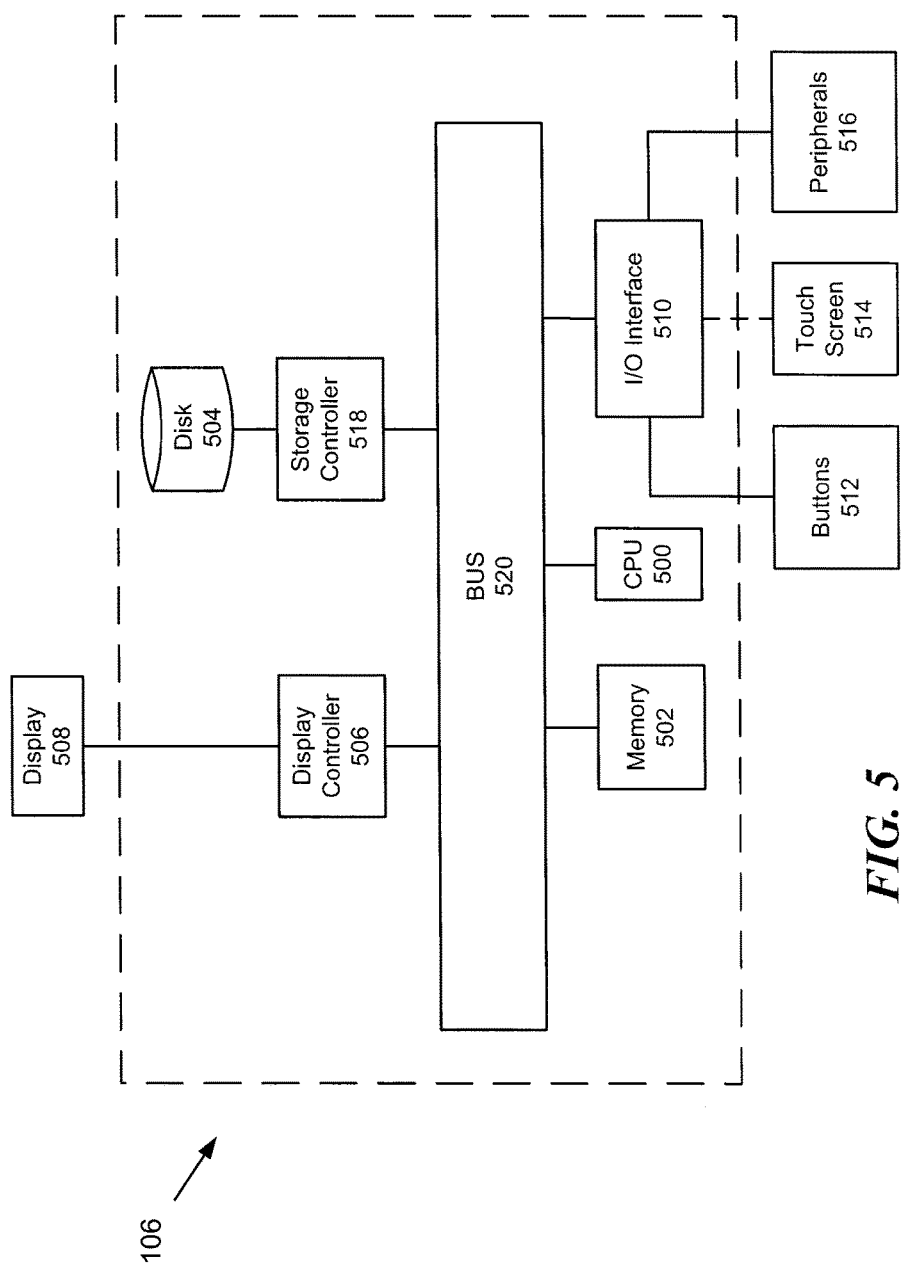
FIG. 5 is an exemplary block diagram of a computing device according to one example.

Next, a hardware description of the computing device 106 according to exemplary embodiments is described with reference to FIG. 5. In FIG. 5, the computing device 106 includes a CPU 500 which performs the processes described herein. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device 106 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

In order to achieve the computing device 106, the hardware elements may be realized by various circuitry elements, known to those skilled in the art. For example, the CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, the CPU 500 may be implemented as multiple processors cooperatively working in parallel to perform the instructions of the inventive processes described above.

The computing device 106 further includes a display controller 506, such as a NVIDIA GeForce GTX or Quadro graphics adaptor from NVIDIA Corporation of America for interfacing with display 508, such as a Hewlett Packard HPL2445w LCD monitor. A general purpose I/O interface 510 interfaces with a keyboard and/or mouse 512 as well as an optional touch screen panel 514 on or separate from display 508. General purpose I/O interface also connects to a variety of peripherals 516 including printers and scanners, such as an OfficeJet or DeskJet from Hewlett Packard.

The general purpose storage controller 518 connects the storage medium disk 504 with communication bus 520, which may be an ISA, EISA, VESA, PCI, or similar, for interconnecting all of the components of the computing device 106. A description of the general features and functionality of the display 508, keyboard and/or mouse 512, as well as the display controller 506, storage controller 518, and general purpose I/O interface 516 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for fused deposition modelling, comprising;
configuring, using processing circuitry, a separation distance between a nozzle and an ultrasonic hammer;
depositing, using the nozzle, a material on a substrate at a first predetermined temperature;
moving, using the processing circuitry, the nozzle and the ultrasonic hammer at a predetermined speed in a predetermined pattern to create an object; and
hammering the deposited material using the ultrasonic hammer to compress the deposited material, wherein the deposited material is at a second predetermined temperature, and
wherein the configuring the separation distance between the nozzle and the ultrasonic hammer includes determining, using the processing circuitry, the separation distance so that the material changes in temperature from the first predetermined temperature when the material is deposited to the second predetermined temperature when the ultrasonic hammer is to compress the deposited material.

2. The method of claim 1, wherein the ultrasonic hammer is operating at a frequency as a function of the type of the material.

3. The method of claim 1, wherein the ultrasonic hammer includes a transducer and an ultrasonic horn.

4. The method of claim 1, wherein the object being fabricated is supported on a movable stage, and wherein the processing circuitry is configured to move the stage in multiple directions.

5. The method of claim 1, wherein the material is a thermoplastic material.

6. The method of claim 1, further comprising:
cooling the deposited material to the second predetermined temperature.

7. The method of claim 1, wherein the ultrasonic hammer includes a piezoelectric transducer.

8. The method of claim 1, further comprising:
detecting the temperature of the deposited material.

9. A system for fused deposition modelling, comprising:
a nozzle configured to deposit a material on a substrate at a first predetermined temperature;
an ultrasonic hammer configured to compress the deposited material, wherein the deposited material is at a second predetermined temperature; and
processing circuitry configured to:
determine a separation distance between the nozzle and the ultrasonic hammer so that the material changes in temperature from the first predetermined temperature when the material is deposited to the second predetermined temperature when the ultrasonic hammer is to compress the deposited material, and
control a movement of the nozzle and the ultrasonic hammer according to a predetermined pattern to create an object.

10. The system of claim 9, further comprising:
a material source to provide raw material.

11. The method of claim 1, wherein the nozzle includes a heater that heats the material to the first predetermined temperature.

12. The method of claim 1, wherein the configuring the separation distance between the nozzle and the ultrasonic hammer includes determining, using the processing circuitry, the separation distance so that the material cools in temperature from the first predetermined temperature when the material is deposited to the second predetermined temperature when the ultrasonic hammer is to compress the deposited material.

13. The method of claim 1, wherein the configuring the separation distance between the nozzle and the ultrasonic hammer includes determining, using the processing circuitry, the separation distance as a function of the type of the material and the predetermined speed of the nozzle and the ultrasonic hammer.

14. The method of claim 1, wherein the second predetermined temperature is a temperature above glass transition temperature of the material and below a melting temperature of the material.

15. The method of claim 1, wherein the ultrasonic hammer operates as a half-wave transformer with a piezoelectric transducer acting as a quarter wave resonator.

16. The method of claim 3, wherein the ultrasonic horn includes a removable tip.

17. The method of claim 3, further comprising:
detecting the temperature of the deposited material using one or more sensors that the ultrasonic horn includes.

\* \* \* \* \*